United States Patent [19]

Arai et al.

[11] Patent Number: 4,595,979
[45] Date of Patent: Jun. 17, 1986

[54] POSITIONING APPARATUS USING A HYDRAULIC ACTUATOR

[75] Inventors: Kenji Arai, Ogawa; Masaharu Inamo, Kawagoe; Kazumasa Kurihara, Meiwa, all of Japan

[73] Assignee: Diesel Kiki Co., Ltd., Japan

[21] Appl. No.: 482,578

[22] Filed: Apr. 6, 1983

[30] Foreign Application Priority Data

Apr. 7, 1982 [JP] Japan .................................. 57-56538

[51] Int. Cl.$^4$ ..................... F16K 31/02; F16K 31/122; G05D 3/00; G05B 15/00
[52] U.S. Cl. ...................................... 364/174; 251/60; 251/129.04; 364/167
[58] Field of Search ............... 364/163, 167, 174, 183, 364/513, 190; 251/130, 31, 60, 131

[56] References Cited

U.S. PATENT DOCUMENTS

| | | |
|---|---|---|
| 3,454,752 | 7/1969 | Zavod .................................. 364/163 |
| 3,664,358 | 5/1972 | Kosugi et al. .................. 251/131 X |
| 3,699,989 | 10/1972 | O'Connor et al. ............. 251/131 X |
| 4,017,056 | 4/1977 | Schwalenstocker et al. ...... 251/131 |
| 4,025,763 | 5/1977 | Kleiss .................................. 364/163 |
| 4,187,454 | 2/1980 | Ito et al. ......................... 364/513 X |
| 4,287,812 | 9/1981 | Iizumi .............................. 251/60 X |
| 4,376,450 | 3/1983 | Fayfield et al. ................ 251/131 X |
| 4,502,109 | 2/1985 | Delmege et al. ..................... 364/174 |

Primary Examiner—Felix D. Gruber
Attorney, Agent, or Firm—Guy W. Shoup

[57] ABSTRACT

A positioning apparatus using a hydraulic actuator. For positioning an object to the desired position with high accuracy, the apparatus has means for computing the position at which the operation for stopping the operation of the hydraulic actuator is to be carried out in order to position the object at the desired position. The operation of the hydraulic cylinder is rendered to stop when the position has reached the computed position, whereby to enable the object to accurately position at the desired position at relatively high speed.

8 Claims, 4 Drawing Figures

POSITIONING APPARATUS USING A HYDRAULIC ACTUATOR

The present invention relates to a positioning apparatus using a hydraulic actuator, and more particularly to a positioning apparatus using a hydraulic actuator in which a high accuracy positioning operation can be realized.

In the various fields, hydraulic actuators have been widely used for positioning members, workpieces or the like.

In the conventional devices, there are provided solenoid valves for controlling the hydraulic pressure applied to a hydraulic actuator connected with the object to be positioned and the positioning operation by the hydraulic actuator is carried out by opening/closing the solenoid valves. For electronically controlling the solenoid valves, a position voltage which varies in level relative to the actual position of the object is compared with a reference voltage representing the desired position at which the object should be positioned, and each of the solenoid valves is selectively closed or opened in such a way that the difference in level between the position voltage and the reference voltage becomes less than a predetermined allowable error value (Japanese Laying-open publication No. 9306/82).

Therefore, the smaller the predetermined error value is, the greater the accuracy of the positioning operation. However, since the device utilizes hydraulic pressure in an hydraulic actuator (e.g. a hydraulic cylinder), a time delay arises in the operation of the hydraulic actuator because of the response characteristics of the solenoid valves. As a result, the hydraulic actuator cannot stop immediately in response to the operation of the solenoid valve or valves so that the hunting will occur when the predetermined allowable error value is set too small in an attempt to increase the positioning accuracy. Therefore, in such conventional positioning apparatuses, it is impossible to increase the accuracy of the positioning operation beyond a certain limit.

Although the above-mentioned drawbacks can be eliminated by providing a suitable orifice for decreasing the moving speed of the hydraulic actuator in the passage of the hydraulic circuit, this decreases the operating speed of the device. Also, even if an orifice is employed to improve the delay characteristic of the hydraulic actuator, the accuracy of the positioning operation will still be affected by the oil temperature, making it difficult to maintain the positioning error at less than a prescribed value under all operating conditions.

It is, therefore, an object of the present invention to provide an improved positioning apparatus using a hydraulic actuator.

It is another object of the present invention to provide a positioning apparatus using a hydraulic actuator in which the object to be positioned can be accurately positioned under various operating conditions.

According to the present invention, in a positioning apparatus having a hydraulic actuator for positioning an object and a valve unit responsive to an electric signal for controlling the hydraulic pressure applied to the hydraulic actuator to control the movement of the hydraulic actuator, the valve unit being located between the hydraulic actuator and a hydraulic pressure source, the positioning apparatus comprises means for producing a first signal relating to the actual position of the object at each instant, means for producing a second signal relating to the desired position at which the object is to be positioned, means responsive to the first and the second signals for producing a third signal relating to the difference between the actual position and the desired position, a controlling means responsive to the third signal for controlling the valve unit to make the difference smaller, a first computing means responsive to the first signal for producing first data indicating the operating speed of the hydraulic actuator, a second computing means responsive to at least the first data for computing second data indicating the position at which the operation for stopping the operation of the hydraulic actuator is to be carried out in order to position the object at the desired position and means responsive to the second data and the first signal for operating said valve unit to stop the operation of the hydraulic actuator when the object actually reaches the position computed by the second computing means.

In the positioning apparatus of the present invention, as the object is being moved to the desired position by means of the hydraulic cylinder on the basis of at least the first and the second signals and data concerning the response characteristics of the hydraulic actuator, a computation is made to determine the position at which the operation for stopping the operation of the hydraulic actuator is to be carried out in order to position the object at the desired position. Then, the valve unit, which comprises solenoid valves, is operated to stop the operation of the hydraulic cylinder in accordance with the computed result.

The position $P_{stop}$ of the hydraulic actuator at which the operation for stopping the operation of the hydraulic cylinder should be carried out by the valve unit in order to position the object at the desired position is represented by the following equation:

$$P_{stop} = P_{CMD} - \frac{v \cdot t_{MV}}{K_1} \tag{1}$$

wherein,
$P_{CMD}$: the position of the hydraulic actuator when the object is at the desired position,
v: the operating speed of the hydraulic actuator,
$t_{MV}$: response dalay time of the solenoid valve of the valve unit,
$K_1$: constant.

In this case, the operating speed v of the hydraulic actuator is obtained as the differentiated value of the first signal with respect to the time, and the speed v depends upon the operating conditions of the hydraulic actuator at each instant, such as hydraulic pressure, oil temperature and the like. As a result, it follows that the determination of the position $P_{stop}$ from the equation (1) takes into account such instantaneous factors affecting the operation condition as hydraulic pressure, oil temperature and the like. Therefore, it is possible to position the object at the desired position with extremely high accuracy under any operating conditions.

Further objects and advantages of the present invention will be apparent from the following detailed description to be read in conjunction with the accompanying drawings in which.

Figure 1:
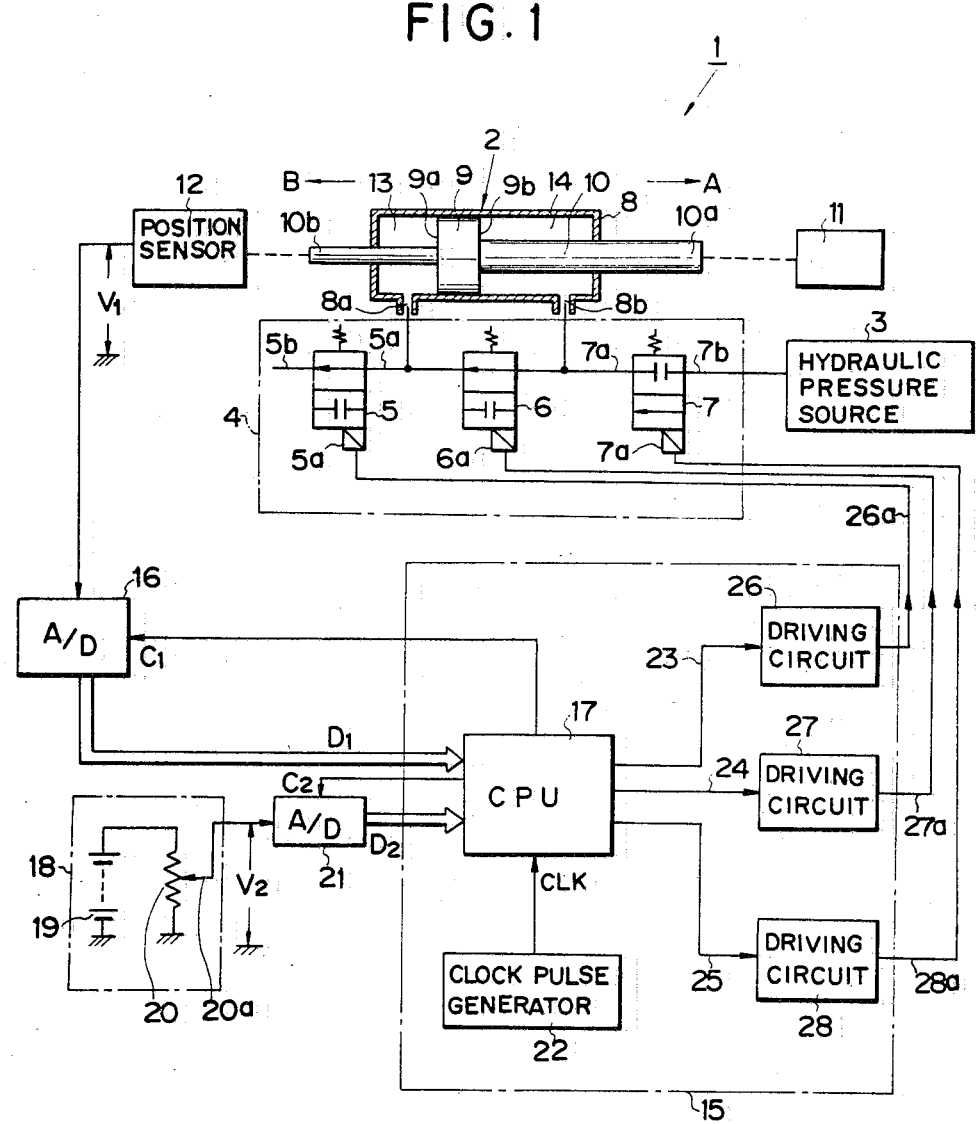
FIG. 1 is a block diagram of an embodiment of a positioning apparatus of the present invention.

Referring to FIG. 1, there is shown an embodiment of the positioning apparatus of the present invention. The positioning apparatus 1 has a differential hydraulic cylinder 2 to which pressurized oil from a hydraulic pressure source 3 is provided through a valve unit 4 having normally open solenoid valves 5 and 6 and a normally closed solenoid valve 7. The hydraulic cylinder 2 has a cylinder tube 8 in which a differential piston 9 with a piston rod 10 is provided. The opposite end portions $10_a$ and $10_b$ of the piston rod 10 project from the cylinder tube 8. The end portion $10_a$ is connected with an object 11 to be positioned by the positioning apparatus 1 and the other end portion $10_b$ is connected with a position sensor 12 for producing a position voltage $V_1$ whose level is indicative of the position of the piston rod 10, i.e. the actual position of the object 11.

The interior of the cylinder tube 8 is divided into a first chamber 13 and a second chamber 14 by the piston 9 and a first port $8_a$ and a second port $8_b$ are provided in the cylinder tube 8 to communicate with the chambers 13 and 14, respectively. The area of one side face $9_a$ of the piston 9 for receiving pressure in the first chamber 13 is larger than that of the other side face $9_b$ of the piston 9 for receiving pressure in the second chamber 14, so that the piston 9 will be moved in the direction indicated by an arrow A when the hydraulic pressure from the hydraulic pressure source 3 is applied to the first and the second chambers 13 and 14 at the same time.

The first port $8_a$ is connected with one port $5_a$ of the solenoid valve 5, which further has a vent port $5_b$ communicating with an oil tank (not shown), and the second port $8_b$ is connected with one port $7_a$ of the solenoid valve 7, which further has a port $7_b$ communicating with the hydraulic pressure source 3. The solenoid valve 6 is provided between the ports $8_a$ and $8_b$, so that the first chamber 13 communicates with the second chamber 14 when the solenoid valve 6 is in the de-energized (open) condition.

Since the hydraulic cylinder 2 and the valve unit 4 are arranged as described above, the first chamber 13 communicates with atmosphere through the solenoid valve 5 and the pressure of the second chamber 14 is equal to that of the hydraulic pressure source 3 when only exciting coils $6_a$ and $7_a$ of the solenoid valves 6 and 7 are energized. As a result, the piston 9 is moved in the direction indicated by an arrow B. When all of the solenoid coils $5_a$, $6_a$ and $7_a$ of the solenoid valves 5, 6 and 7 are de-energized, the solenoid valves assume normal valve position, so that the movement of the piston 9 stops to hold the object 11 at that position. When only the solenoid coils $5_a$ and $7_a$ are energized, since the hydraulic pressure from the hydraulic pressure source 3 is provided through the solenoid valves 6 and 7 into the first and second chambers 13 and 14, respectively, for the reasons described above, the piston 9 moves in the direction indicated by the arrow A.

That is, the hydraulic cylinder 2 can be operated so as to move the object 11 in either direction or to stop the object 11 by selectively operating the solenoid valves 5, 6 and 7, whereby the object 11 can be positioned at any desired position.

In order to control the position of the object 11 by operating the valve unit 4, the positioning apparatus 1 has a control circuit 15 to which digital data $D_1$ corresponding to the position voltage $V_1$ is applied. Data $D_1$ is obtained by converting the position voltage $V_1$ into a digital form by means of an analog-digital converter 16 which is controlled by a control signal $C_1$ from a central processing unit (CPU) 17 in the control circuit 15.

Reference numeral 18 denotes a reference voltage generator for generating a reference voltage $V_2$ whose level is set so as to correspond to the desired or target position at which the piston rod 10 is to be positioned. As will be understood from the above description, since the object 11 is connected to the end portion $10_a$ of the piston rod 10 through, for example, a link mechanism, the level of the reference voltage $V_2$ is also indicative of the desired position at which the object 11 is to be positioned. The reference voltage generator 18 is composed of a direct current voltage source 19 and a variable resistor 20 which is connected in parallel with the voltage source 19 and the reference voltage $V_2$ is derived from the movable terminal $20_a$ of the yarialbe resistor 20. The reference voltage $V_2$ is converted into digital form by an analog-digital converter 21 which is controlled by a control signal $C_2$ from the CPU 17 to obtain digital data $D_2$ indicating the level of the reference voltage $V_2$.

A clock pulse train signal CLK from a clock pulse generator 22 is applied to the CPU 17. A control program for controlling the valve unit 4 in such a way that the object 11 can be accurately positioned at the position indicated by the data $D_2$ is stored in the CPU 17. The CPU 17 carries out the programmed computation for accurately positioning the object 11 at the desired position by means of the hydraulic cylinder 2, using the accurate time interval information provided by the clock pulse train signal CLK. The data $D_1$ and $D_2$ are forwarded to the CPU 17 as input data when the control program stored in the CPU 17 is executed.

The CPU 17 has three output lines 23, 24 and 25 which are connected to driving circuits 26, 27 and 28, and the output lines $26_a$, $27_a$ and $28_a$ of these driving circuits 26, 27 and 28 are connected to the solenoid coils $5_a$, $6_a$ and $7_a$, respectively. The levels of these output lines 23, 24 and 25 selectively change between high and low level in accordance with the result computed by the CPU 17, and each of the solenoid coils can be selectively energized by the corresponding driving circuit when the level of the corresponding output line of the CPU 17 is high.

Figure 2:
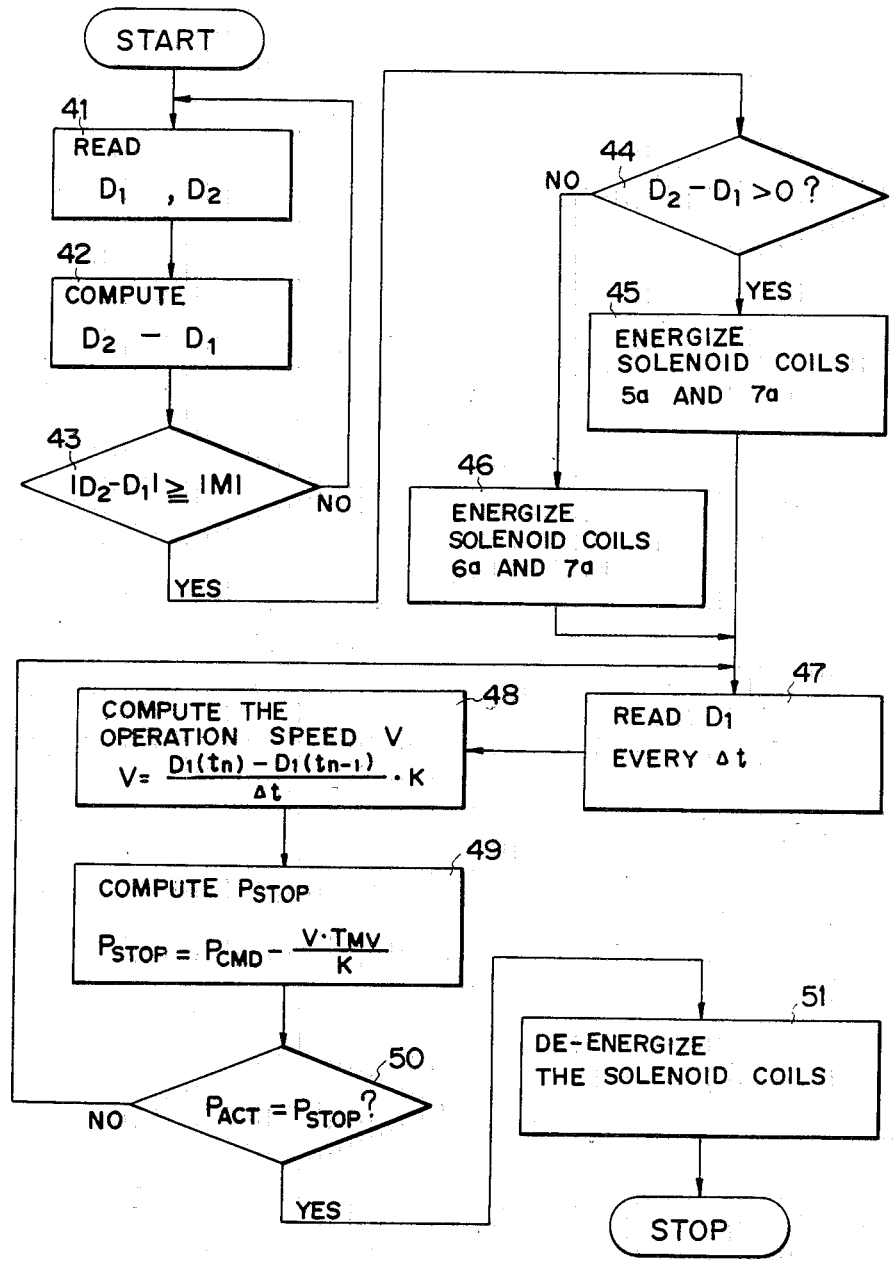
FIG. 2 is a flow chart of the control program stored in the CPU of FIG. 1.

In FIG. 2, there is shown a flow chart of the control program stored in the CPU 17. When the execution of the control program is started, after the analog-digital converters 16 and 21 are rendered operative by the control signals $C_1$ and $C_2$ to produce the data $D_1$ and $D_2$, the data $D_1$ and $D_2$ are read into the CPU 17 (step 41) and stored in the memory area of the CPU 17. Then, $(D_2-D_1)$ is computed in step 42 to obtain the difference between the actual position and the desired position of the object 11, and the absolute value of $(D_2-D_1)$ is compared with the absolute value of a predetermined value M which indicates the allowable range within which the actual position of the object 11 will be considered to be equal to the desired position (step 43). For example, the value M can be set at ±0.07 mm. Therefore, when $|D_2-D_1|$ is less than $|M|$, that is, when the discriminated result in step 43 is "NO", since the actual position of the object 11 will be considered to be equal to the desired position, the execution of the control program is returned to the step 41 without execution of the steps for the positioning operation. On the other hand, when the discriminated result in the step 43 is "YES", the execution of the control program is advanced to step 44.

In the step 44, it is discriminated whether the computed value ($D_2-D_1$) is positive or negative. In this case, since the level of the position voltage $V_1$ is increased as the piston rod 10 moves in the direction shown by the arrow A, when the discriminated result in the step 44 is "YES", only the output lines 23 and 25 are rendered to be high level in order that only the solenoid coils $5_a$ and $7_a$ are energized to close the solenoid valve 5 and to open the solenoid valves 6 and 7 (step 45). As a result, the piston 9, and accordingly the object 11, move in the direction of the arrow A to reduce the difference between $D_1$ and $D_2$. When the discriminated result in the step 44 is "NO", only the output lines 24 and 25 are rendered to be high level in order that only the solenoid coils $6_a$ and $7_a$ are energized to close the solenoid valve 6 and to open the solenoid valves 5 and 7 (step 46). As a result, the piston 9 moves in the direction of the arrow B to reduce the difference between $D_1$ and $D_2$.

Thus, upon starting the positioning operation by the use of the hydraulic cylinder 2, the control signal $C_1$ is produced in response to the clock pulse train signal CLK in such a way that the position voltage $V_1$ is converted into digital form at a predetermined time interval $\Delta t$ based on the time interval information of the clock pulse train signal CLK (step 47). As a result, the data $D_1$ is produced every $\Delta t$ and this data is read into the CPU 17. In step 48, the operating speed v of the hydraulic cylinder 2, that is, the moving speed of the piston 9 of the hydraulic cylinder 2 is easily computed in accordance with the following equation:

$$v = \frac{D_1(t_n) - D_1(t_{n-1})}{\Delta t} \cdot K_2 \quad (2)$$

wherein,
$D_1(t_n)$: the value of $D_1$ obtained at the analog-digital conversion timing of $t_n$
$D_1(t_{n-1})$ the value of $D_1$ obtained at the analog-digital conversion timing of $t_{n-1}$ ($=t_n-\Delta t$)
$K_2$: constant.

After this computation is carried out, in step 49 the position $P_{stop}$ at which the operation of the hydraulic cylinder 2 should be stopped in order to position the object 11 or the piston 9 at the desired position which is shown by the reference voltage $V_2$, is computed on the basis of the equation (1) and the operating speed v obtained by the use of the equation (2).

$P_{stop}$ computed in the step 49 is indicative of the position at which the operation of the hydraulic cylinder 2 should be stopped, and in step 50, it is discriminated whether or not the actual position $P_{act}$ indicated by the data $D_1$ is coincident with the computed position $P_{stop}$. When the discriminated result in the step 50 is "NO", that is, when the position $P_{act}$ of the piston 9 has not reached the position $P_{stop}$, the steps 47 to 49 are repetitively executed until position $P_{act}$ becomes coincident with the position $P_{stop}$.

When the discriminated result in the step 50 is "YES", all of the solenoid coils are de-energized (step 51), so that the actuating hydraulic force for moving the piston 9 is removed from the hydraulic cylinder 2. As a result, after a predetermined time has passed, the piston 9 stops moving, so that the object 11 is positioned at the desired position.

As described above, the timing of the operation for stopping the operation of the hydraulic cylinder can be accurately determined since the response characteristics of the solenoid valves and the hydraulic cylinder are considered in determining this timing, and moreover, the timing is computed on the basis of the operating speed of the hydraulic cylinder at each instant. Therefore, it is possible to position the object 11 at the desired position with extremely high accuracy.

That is, since the operation speed v is affected by various operating conditions of the hydraulic cylinder 2, such as hydraulic pressure, oil temperature, oil viscosity and the like, when the controlling operation for the hydraulic cylinder 2 is carried out in accordance with the data $P_{stop}$ which is obtained by the use of data concerning the operation speed v of the hydraulic cylinder 2, an extremely accurate positioning operation of the hydraulic cylinder 2 can be carried out.

The positioning apparatus 1 of the present invention is widely applicable as the positioning apparatus in industrial robots and various other devices.

According to the present invention, since the positioning operation is carried out in accordance with a computed prediction based on the operation speed of the hydraulic cylinder, hunting does not occur, so that the positioning operation can be smoothly and accurately carried out. As a result, the accuracy of the positioning operation can be remarkably improved without providing an orifice for adjusting the operating speed of the hydraulic cylinder, so that the high accuracy positioning operation can be attained at high operating speeds.

Figure 3:
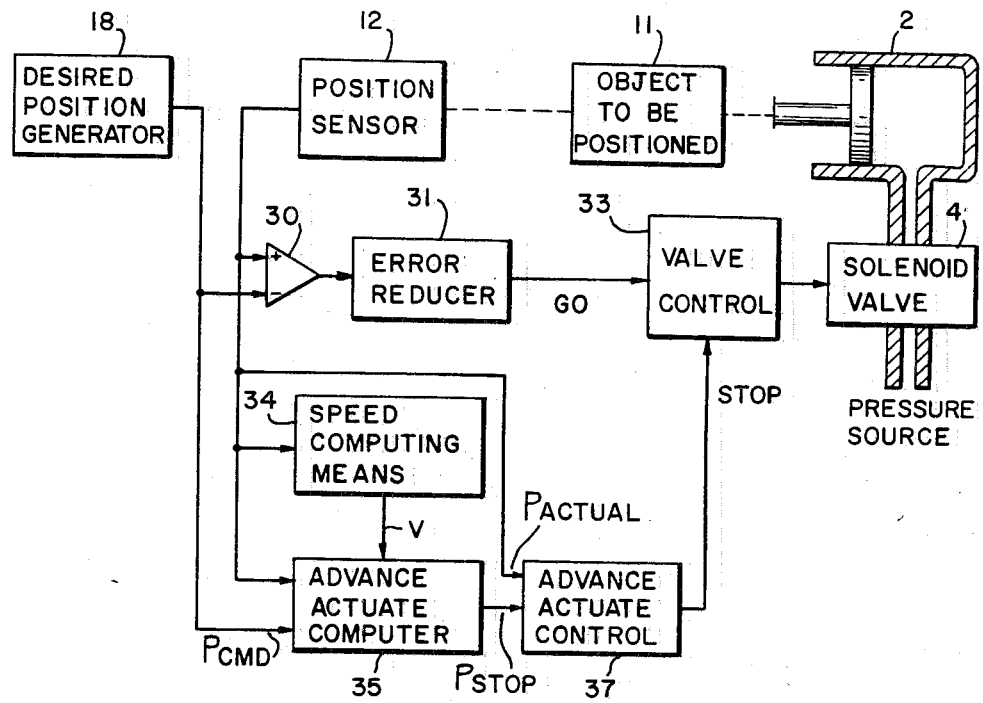
FIGS. 3 and 4 are block diagrams of other embodiments of the invention.

Referring to FIG. 3, another embodiment of the present invention is illustrated. A signal generator 18 outputs a signal representing the desired position, $P_{CMD}$. A position sensor 12 outputs a signal representing the actual position of the object to be positioned 11 by a hydraulic actuator 2.

A first system, for moving the object to the desired position, comprises a positonal difference determinator 30 which generates a signal representing the error between the desired position $P_{CMD}$ and the actual position, $P_{ACTUAL}$; and an error reducer 31 which drives a valve control 3 to activate the solenoid valve in such a way that the error moves toward a minimum level.

A second system, for stopping the object at the desired position, includes an advance actuate computer 35 which computes an advanced actuate position, $P_{STOP}$, at which the solenoid valve 4 is first actuated so that the moving object 11 stops at the desired position, $P_{CMD}$, or very close thereto. A speed computing means 34 provides the computer 35 with data representing the object's speed data from which $P_{STOP}$ can then be calculated. When $P_{ACTUAL}$, the position of the moving object, reaches the computer $P_{STOP}$, a STOP signal is generated by the advance actuate control 37 the object 11 comes to a stop some time later, that time being the response delay time of the valve and hydraulic actuator.

Figure 4:
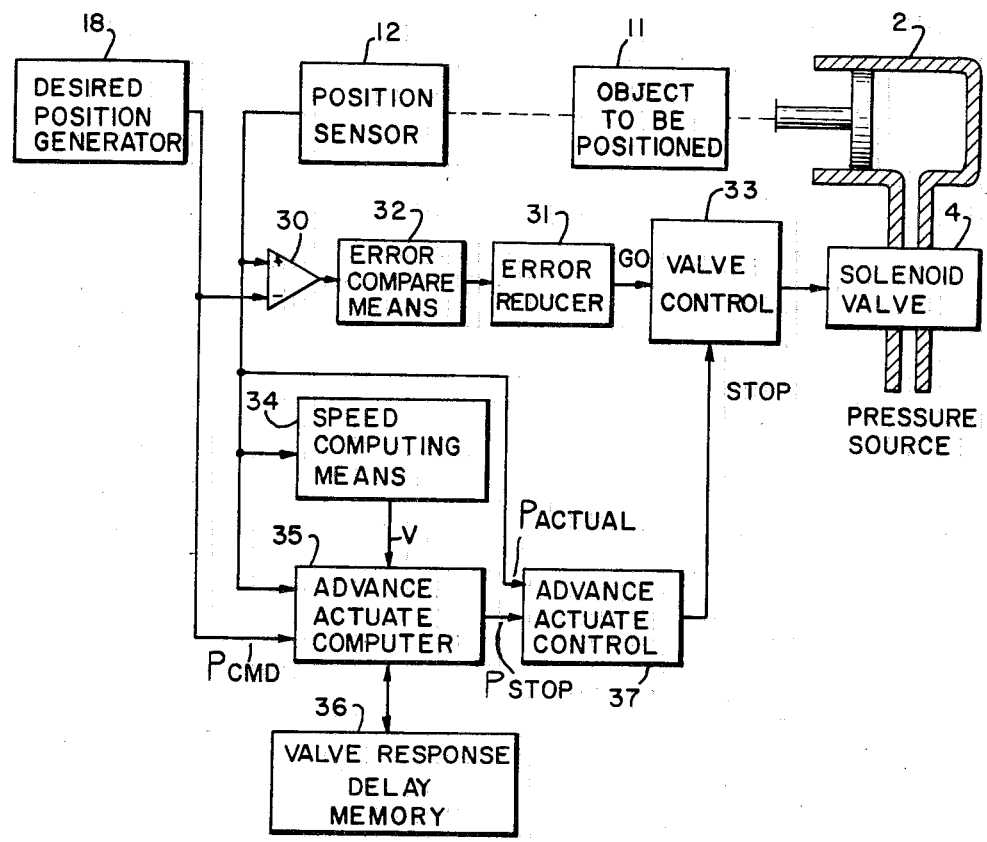

FIG. 4 illustrates another embodiment where the error reducer is not activated until the error exceeds a predetermined minimal error in the error compare means 32. The computer 35 has a memory means 36 in which $t_{mv}$, the response delay time of the solenoid valve, is stored.

We claim:
1. A position control apparatus comprising a hydraulic actuator operatively connected with an object to be positioned and a valve unit which is located between said hydraulic actuator and a hydraulic pressure source for controlling the driving/stopping operation of said hydraulic actuator and has at least one solenoid valve responsive to an electric signal for controlling the hydraulic pressure supplied to said hydraulic actuator, said object being positioned at a desired position by the operation of said solenoid valve, said apparatus further comprising:

means for producing a first signal relating to the position of said object at each instant;

means for producing a second signal relating to a desired position at which said object is to be positioned;

first means responsive to the first and second signals for determining the difference between the actual position and the desired position of said object;

second means responsive to the result of said first means for controlling the open/close state of said solenoid valve so that said hydraulic actuator is driven in the direction for making the difference smaller;

first computing means responsive to the first signal for producing first data indicating the speed of movement of said hydraulic actuator;

second computing means responsive to at least the first signal, the second signal and the first data for computing second data indicating the position of said object at which the operation of said solenoid valve for stopping the driving of said hydraulic actuator is to be carried out in order to position said object at the desired position; and third means responsive to the second data and the first signal for operating said solenoid valve so as to stop the operation of said hydraulic actuator when said object actually reaches the position indicated by the second data.

2. An apparatus as claimed in claim 1 wherein said second means has discriminating means responsive to the result of said first means for discriminating in which direction said hydraulic actuator is to be operated and means for operating said solenoid valve so as to operate the hydraulic actuator in the direction determined by said discriminating means, whereby the difference between the actual position and the desired position of said object is reduced.

3. An apparatus as claimed in claim 1 wherein said second computing means computes the second data by taking into consideration the response delay of said solenoid valve.

4. An apparatus as claimed in claim 1 further comprising means responsive to the result of said first means for discriminating whether or not the absolute value of the difference is less than a predetermined value such that the positioning control operation is carried out only when the absolute value of the difference is less than the predetermined value.

5. An apparatus as claimed in claim 1 wherein said first computing means produces the differentiated value of the first signal with respect to time as the first data.

6. An apparatus as claimed in claim 1 wherein said hydraulic actuator is a differential type hydraulic cylinder having a cylinder tube and a differential piston which is received in the cylinder tube to divide the cylinder space of the cylinder tube into a first chamber and a second chamber and said valve unit has a first solenoid valve to enable communication of the first chamber with the hydraulic pressure with the same level as that of the atmospheric pressure, a second solenoid valve to enable communication of the first chamber with the second chamber and a third solenoid valve to enable communication of the second chamber with the hydraulic pressure chamber.

7. A position controller for moving an object to a desired position comprising:

a hydraulic actuator for moving the object;

a solenoid valve for stopping the hydraulic actuator;

computing means for computing an advance position at which to actuate the solenoid valve before the desired position is reached, the computing means having memory means for storing response delay characteristics of said solenoid valve and hydraulic actuator, input means for inputting the actual position of the object being moved and output means for actuating the solenoid valve when the object reaches said advance position.

8. A position controller according to claim 7 wherein the advance actuation position, $P_{STOP}$, is computed according to the formula:

$$P_{STOP} = P_{CMD} - V \cdot T/K$$

wherein $P_{CMD}$ is the desired position;

V is the rate of change of the actual position;

T is a response delay time stored in the memory means, and

K is a constant delay factor stored in the memory means.

* * * * *